(12) United States Patent
Fan et al.

(10) Patent No.: US 9,106,954 B2
(45) Date of Patent: *Aug. 11, 2015

(54) SET TOP BOX WITH CAPABILITY TO SUPPORT USER IDENTIFICATION

(71) Applicant: AT&T INTELLECTUAL PROPERTY I, L.P., Atlanta, GA (US)

(72) Inventors: James Fan, San Ramon, CA (US); Jennifer Lam, Fremont, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/164,976

(22) Filed: Jan. 27, 2014

(65) Prior Publication Data

US 2014/0143822 A1    May 22, 2014

Related U.S. Application Data

(63) Continuation of application No. 12/618,110, filed on Nov. 13, 2009, now Pat. No. 8,677,443.

(51) Int. Cl.
*H04N 7/16* (2011.01)
*H04N 21/45* (2011.01)
*H04N 21/258* (2011.01)
*H04N 21/426* (2011.01)
*H04N 21/441* (2011.01)
*H04N 21/443* (2011.01)

(52) U.S. Cl.
CPC ..... *H04N 21/4516* (2013.01); *H04N 21/25816* (2013.01); *H04N 21/25833* (2013.01); *H04N 21/42684* (2013.01); *H04N 21/441* (2013.01); *H04N 21/443* (2013.01)

(58) Field of Classification Search
None
See application file for complete search history.

(56) References Cited

U.S. PATENT DOCUMENTS

| | | | |
|---|---|---|---|
| 6,845,396 B1 | 1/2005 | Kanojia et al. | |
| 7,047,273 B2 | 5/2006 | Kamentsky et al. | |
| 7,234,060 B1* | 6/2007 | Amdur et al. | 713/176 |
| 8,677,443 B2* | 3/2014 | Fan et al. | 725/132 |
| 2003/0105639 A1* | 6/2003 | Naimpally et al. | 704/276 |
| 2004/0045031 A1* | 3/2004 | Gautier | 725/110 |
| 2004/0054771 A1* | 3/2004 | Roe et al. | 709/224 |
| 2005/0246746 A1 | 11/2005 | Yui et al. | |
| 2005/0273817 A1* | 12/2005 | Rodriguez et al. | 725/46 |
| 2007/0041554 A1 | 2/2007 | Newman et al. | |
| 2007/0050836 A1* | 3/2007 | Stanek et al. | 725/131 |
| 2007/0061615 A1* | 3/2007 | Stalker et al. | 714/6 |
| 2007/0152033 A1* | 7/2007 | Hind et al. | 235/376 |
| 2007/0162928 A1* | 7/2007 | Mickle et al. | 725/37 |
| 2007/0260927 A1 | 11/2007 | Smith et al. | |
| 2007/0277201 A1* | 11/2007 | Wong et al. | 725/40 |
| 2008/0022336 A1 | 1/2008 | Howcroft et al. | |

(Continued)

*Primary Examiner* — Junior Mendoza
(74) *Attorney, Agent, or Firm* — Toler Law Group, PC

(57) ABSTRACT

A method includes receiving a request related to a set top box, the request having a public identifier of the set top box and a user account identifier. The public identifier is accessible by a user associated with the set top box. The method also includes accessing a user record, corresponding to a location, from a database of user records. The method further includes determining, from the user record, a private identifier of the set top box corresponding to the public identifier of the set top box, wherein the private identifier is unique to the set top box among a set of set top boxes associated with the user record and the private identifier is inaccessible by the user and using the private identifier to perform an action related to the set top box in response to the request.

19 Claims, 6 Drawing Sheets

(56) References Cited

U.S. PATENT DOCUMENTS

| | | |
|---|---|---|
| 2008/0155076 A1 | 6/2008 | Liao et al. |
| 2008/0222689 A1 | 9/2008 | Howcroft et al. |
| 2009/0025028 A1 | 1/2009 | Cassanova et al. |
| 2009/0089854 A1 | 4/2009 | Le et al. |
| 2009/0122879 A1 | 5/2009 | Howe et al. |
| 2009/0254952 A1 | 10/2009 | Sridhar et al. |
| 2009/0300723 A1* | 12/2009 | Nemoy et al. .................. 726/4 |
| 2009/0313665 A1 | 12/2009 | Rouse |
| 2011/0010744 A1 | 1/2011 | Stecyk et al. |
| 2011/0119720 A1 | 5/2011 | Fan et al. |
| 2011/0211597 A1* | 9/2011 | Kasatani .................. 370/503 |

\* cited by examiner

SET TOP BOX WITH CAPABILITY TO SUPPORT USER IDENTIFICATION

CLAIM OF PRIORITY

The present application is a continuation of and claims priority to U.S. patent application Ser. No. 12/618,110, filed on Nov. 13, 2009, entitled "SET TOP BOX WITH CAPABILITY TO SUPPORT USER IDENTIFICATION," the contents of which are expressly incorporated herein by reference in their entirety.

FIELD OF THE DISCLOSURE

The present disclosure is generally related to user identification of a set top box.

BACKGROUND

For certain television services, each television set may be connected to a set top box (STB) and each STB may be connected to a network via a residential gateway (RG). Each STB is associated with a globally unique identifier (GUID) as its device identifier. When a STB is plugged into the RG, it will go through an authentication process to have the GUID registered in the network. If there is more than one STB installed at the residence, there will be multiple GUIDs registered in the network and any related systems. Subscribers do not have access to the GUIDs.

When a STB is not functioning properly, the subscriber may use a self-service channel to attempt to resolve the problem. The self-service channel may prompt the subscriber to provide information to try and determine which STB is not functioning properly. However, the subscriber may not be able to access, view, or otherwise determine the GUID of the malfunctioning STB.

DETAILED DESCRIPTION

In a particular embodiment, a method for performing a service action on a particular set top box based on a particular private identifier associated with the particular set top box is disclosed. At a database associated with a service provider, a user record for a user is created. The user record includes a public identifier accessible by the user and a private identifier inaccessible by the user for each of a plurality of set top boxes associated with the user. If a particular set top box is not operating properly, a service request associated with the particular set top box may be received at a server. The service request may include a particular public identifier associated with the particular set top box that is not operating properly. The particular public identifier is used to determine a particular private identifier associated with the particular set top box. Based on the particular private identifier, a service action is performed on the particular set top box. In a particular embodiment, the particular public identifier is user defined. In a particular embodiment, the particular private identifier is a globally unique identifier (GUID), and the GUID is used to remotely retrieve problem logs from the particular set top box. In another particular embodiment, the particular set top box that is not operating properly is rebooted in response to performing the service action while set top boxes, other than the particular set top box, are not rebooted.

In another particular embodiment, a device is disclosed that includes a server having access to a database associated with a service provider. The database stores a public identifier accessible by a user and a private identifier inaccessible by the user for each of a plurality of set top boxes (STBs) accessible by the user. Each of the plurality of STBs is in communication with the server. The device also includes a user service interface to receive a service request associated with a particular STB of the plurality of STBs. The service request includes a particular public identifier associated with the particular STB, and the particular public identifier is used to determine a particular private identifier by accessing the database. The device further includes a service module to perform a service action based on the particular private identifier associated with the particular STB.

In another particular embodiment, a system is disclosed that includes a gateway coupled to a plurality of set top boxes (STBs). The system also includes a network output of the gateway, where the network output is operable to output a service request associated with a particular STB of a plurality of STBs coupled to the gateway. The system further includes a network input of the gateway, where the network input receives a command from the server. The command is associated with a service action to be performed with respect to the particular STB.

Figure 1:
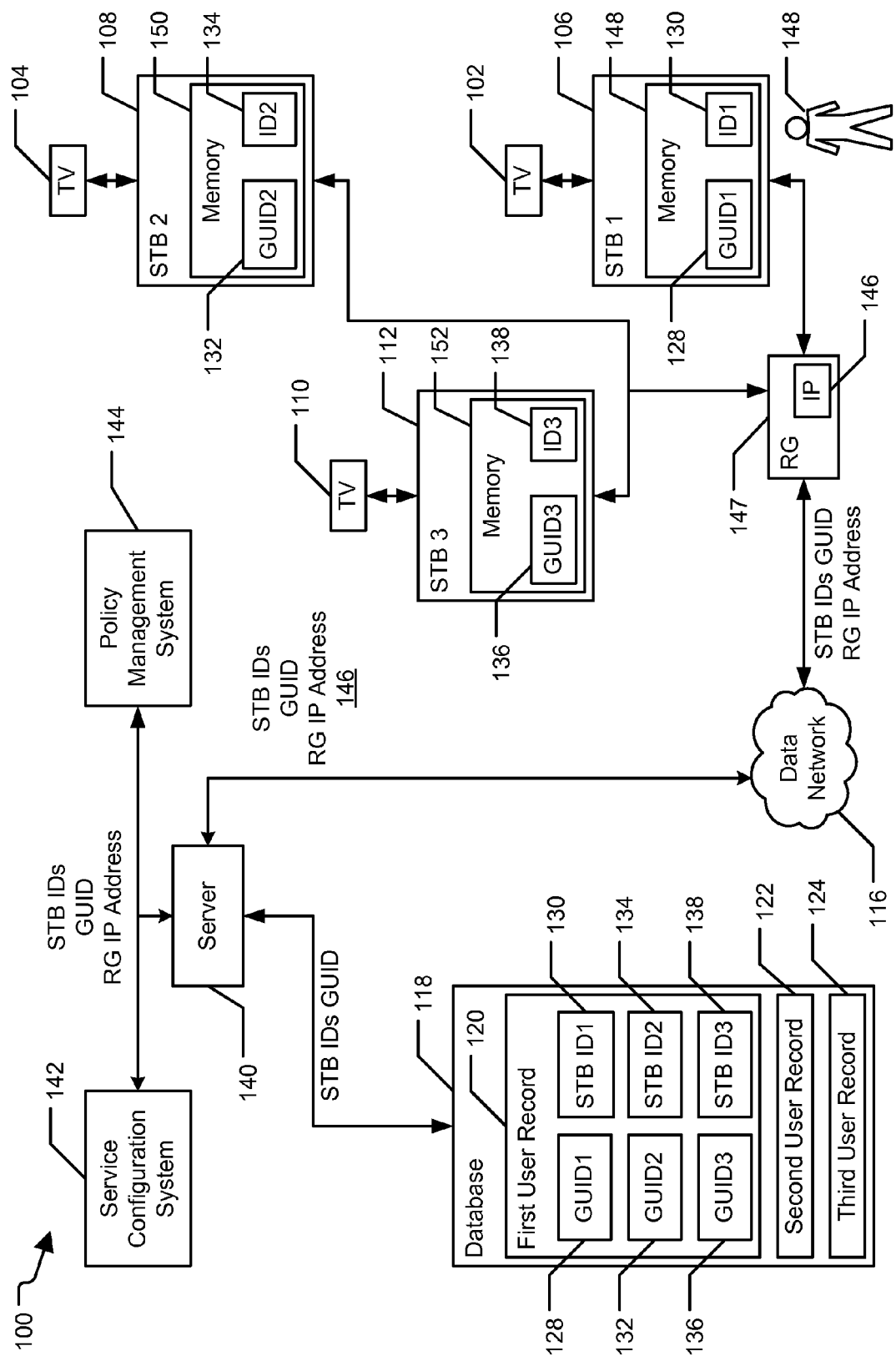
FIG. 1 is a block diagram of a first particular embodiment of a system to support user identification of a set top box.

FIG. 1 depicts a communication system 100 that supports user identification of a set top box. The communication system 100 includes a data network 116, a server 140, a service configuration system 142, and a policy management system 144. The server 140 is coupled to a database 118. The data network 116 is coupled to a residential gateway 147. The residential gateway 147 is coupled to a plurality of set top boxes including a first set top box 106, a second set top box 108, and a third set top box 112. The first set top box 106 contains a first memory 148. The second set top box 108 contains a second memory 150. The third set top box 112 contains a third memory 152. Each of the set top boxes is coupled to a display device such as a first television 102, a second television 104, and a third television 110, as illustrated in FIG. 1. Each of the set top boxes 106, 108, 112 may be located within a residence or office of a user 148. The data network 116 may be coupled to a plurality of residential gateway devices even though only a single residential gateway 147 is shown in FIG. 1.

The database 118 includes a plurality of user records, such as a first user record 120, a second user record 122, and a third user record 124. For each user of a plurality of set top boxes, such as the representative user 148, the user record includes a public identifier accessible by the user and a private identifier that is not accessible by the user corresponding to each set top box. For example, in the first user record 120, the first public identifier 130 and the first private identifier 128 are associated with the first set top box 106. The second public identifier 134 and the second private identifier 132 are associated with the second set top box 108. The third public identifier 138 and the third private identifier 136 are associated with the third set top box 112. In a particular embodiment, the first private identifier 128, the second private identifier 132, and the third private identifier 136 are distinct globally unique identifiers (GUIDs). The use of GUIDs may enable a service provider to uniquely identify any deployed STB, thereby enabling activation and blocking of services and features (e.g., pay-per-view and video on demand) on a STB-by-STB basis. The user records within the database 118 are each accessible by the server 140, by the policy management system 144, and by the service configuration system 142.

In a particular embodiment, the server 140 includes an internet protocol television (IPTV) platform. The IPTV platform of the server 140 is operable to communicate multimedia services via the data communication network 116 to the residential gateway 147 for display and for use by each of the plurality of set top boxes of the representative user 148.

Each of the plurality of set top boxes receives and is configured to communicate a public identifier to the representative user 148. For example, the first set top box 106 is operative to communicate the first public identifier 130, the second set top box 108 is operative to communicate the second public identifier 134, and the third set top box 112 is operative to communicate the third public identifier 138. Further, each of the plurality of set top boxes is uniquely identified by a private identifier. For example, the first set top box 106 is identified by the first private identifier 128, the second set top box 108 is identified by the second private identifier 132, and the third set top box 112 is identified by the third private identifier 136. It should be noted that each of the private identifiers is not accessible by the user 148. For example, the first private identifier 128 may be stored in a secure portion of a memory or in a secure memory that is not accessible by a user of the first set top box 106.

During use, the user 148 activates one or more of the plurality of set top boxes. For example, the user 148 may plug the first set top box 106, the second set top box 108, and the third set top box 112 into wall outlets to supply power to each set top box. In a particular embodiment, a technician may activate one or more of the plurality of set top boxes instead of the user 148. After activation, the residential gateway 147 sends an Internet protocol (IP) address 146 stored in the residential gateway 147 along with the private identifiers 128, 132, 136 stored in each of the plurality of set top boxes to the server 140 for authentication. For example, the residential gateway 147 may send the IP address 146 stored in the residential gateway 147 along with the first private identifier 128 from the first set top box 106.

The server 140 sends the IP address 146 and one or more of the private identifiers to the policy management system 144 to be associated with a valid user record 120 for the representative user 148. In a particular embodiment, the policy management system 144 queries the service configuration system 142 to identify a set top box order for the user record 120. In another particular embodiment, the private identifiers and customer account identification are stored in both the service configuration system 142 and the policy management system 144. The service configuration system 142 directs the server 140 to accept the set top box authentication request and to store the private identifiers in the database 118.

The server 140 assigns a unique public identifier to each set top box and stores each of the public identifiers in the database 118. For example, the server 140 may assign a 2 digit code such as "01" as the first public identifier 130 for the first set top box 106. As another example, the server 140 may assign a text string such as "bedroom STB" as the first public identifier 130 for the first set top box 106. The unique public identifier for each set top box and is then sent to each corresponding set top box. For example, the first public identifier 130 is sent to the first set top box 106, the second public identifier 134 is sent to the second set top box 108, and the third public identifier 138 is sent to the third set top box 112. The server 140 also sends the account identification, the private identifier, and the public identifier for each set top box to both the policy management system 144 and the service configuration system 142.

Each set top box stores its private identifier and its public identifier to its internal memory. For example, the first set top box 106 may store the private identifier 128 and the public identifier 130 in the memory 148. In a particular embodiment, the memory 148 is a nonvolatile memory. In a particular embodiment, each set top box is operable to display the public identifier onto an LED screen or television. In another particular embodiment, a built-in audio chipset may audibly identify the public identifier. For example, the set top box may play its public identifier to a user who is visually impaired using text-to-speech conversion and a speaker. In a particular embodiment, the set top box automatically plays the public identifier following an authentication process during set top box installation and is configured to play the public identifier when requested by a user (e.g., via a dedicated button at a remote control of the set top box).

Figure 2:
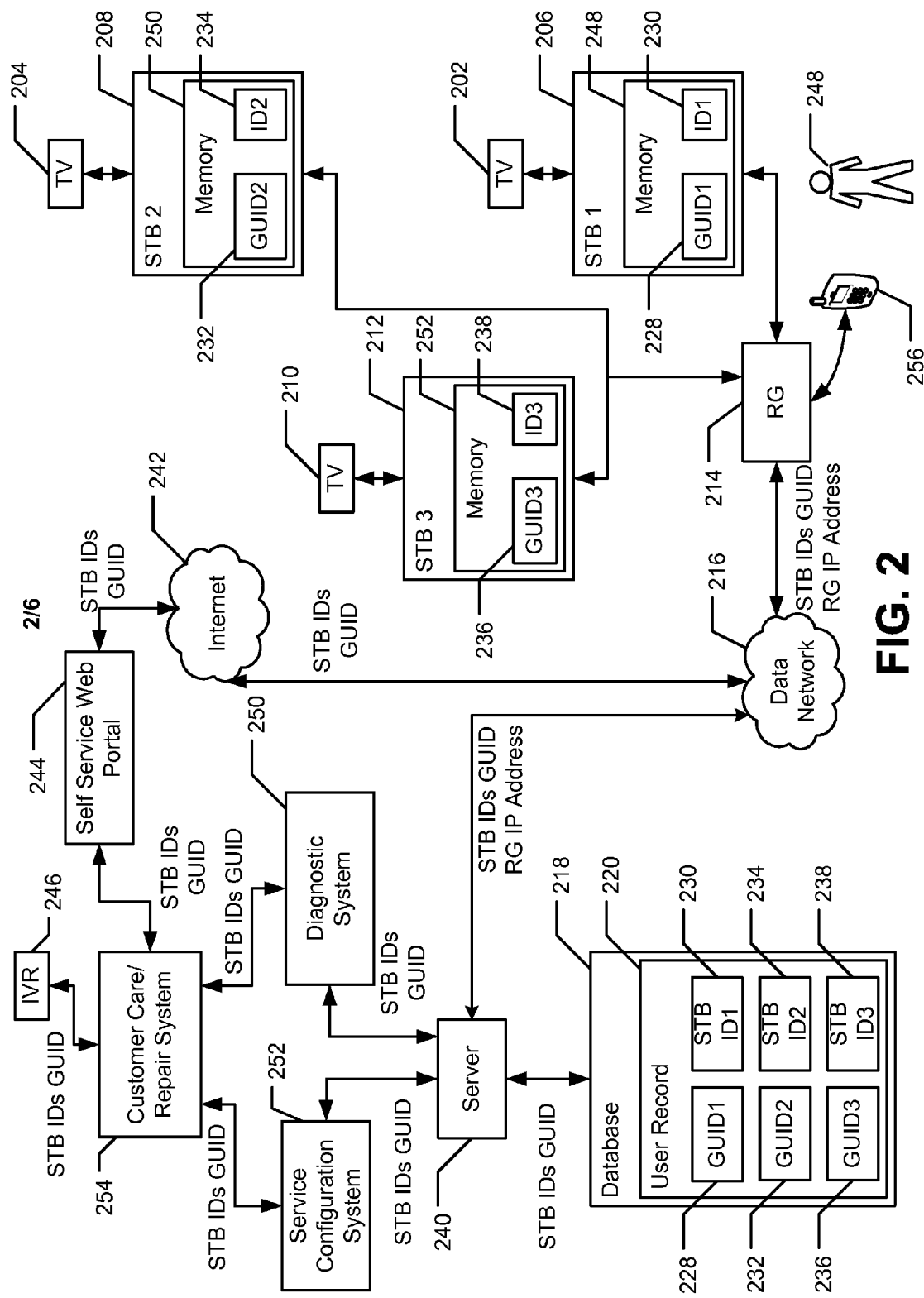
FIG. 2 is a block diagram of a second particular embodiment of a system to support user identification of a set top box.

Referring to FIG. 2, an illustrative embodiment of a system to support set top box identification is illustrated. The system includes a data network 216, a representative server 240, a database 218, and a public network 242, such as the Internet. The system further includes a service configuration system 252, a diagnostic system 250, a customer care/repair service system 254, a self-service web portal 244, and an interactive voice response (IVR) system 246. The service configuration system 252 is coupled to the server 240. Similarly, the diagnostic system 250 is coupled to the server 240. The customer care/repair service system 254 is coupled to the service configuration system 252 and to the diagnostic system 250. The self-service portal 244 is coupled to the public internet 242 and is coupled to the customer care/repair service system 254. The interactive voice response system 246 is coupled to the customer care/repair service system 254 and is coupled to receive calls, such as calls from users of a communication service. A representative user 248 is shown in FIG. 2.

The system includes a residential gateway 214 that is coupled to a plurality of set top boxes. For example, the residential gateway 214 is coupled to a first set top box 206, a second set top box 208, and a third set top box 212. The first set top box 206 contains a first memory 248, and the first memory 248 contains a first public identifier 230 and a first private identifier 228. The second set top box 208 contains a second memory 250, and the second memory 250 contains a second public identifier 234 and a second private identifier 232. The third set top box 212 contains a third memory 252, and the third memory 252 contains a third public identifier 238 and a third private identifier 236. Each of the set top boxes is coupled to a display device such a television, as shown. For example, the first set top box 206 is coupled to the first television 202, the second set top box 208 is coupled to the second television 204, and the third set top box 212 is coupled to the third television 210. Each of the set top boxes 206, 208, 212 are accessible by the user 248 and may be located within a residence or office of the user 248. The residential gateway 214 may also be coupled to a communication device such as a phone 256 for use by the user 248. The phone 256 may be utilized for placing calls via the residential gateway 214 or may be used to place calls over an alternative network, such as a wireless network or a landline telephone network.

The database 218 includes a user record 220 associated with the representative user 248. The user record 220 includes the first public identifier 230, the first private identifier (e.g. a first GUID) 228, the second public identifier 234, the second private identifier (e.g. a second GUID) 232, the third public identifier 238, and the third private identifier (e.g. a third GUID) 236. The user record 220 may be created in the database 218 by a service provider through use of commands from the server 240. Alternatively, commands to the database 218 may be received from other components of the service provider network, such as from the service configuration system 252.

In a particular embodiment, public identifiers may be user defined. For example, the first public identifier 230, the second public identifier 232, and the third public identifier 238 may be defined by the user 248. The user 248 may utilize an input device to one of the set top boxes, such as the first set top box 206, to input a selected identifier to define the first public identifier 230 for the first set top box 206. The user defined identifier may be communicated by the residential gateway 214 via the data network 216 to the server 240. The server 240 may update a record or create a new record or a data entry, such as a data entry in the first user record 220 to include the public identifier defined by the user 248. Similarly, each of the public identifiers 234 and 238 may be user defined. In a particular embodiment, each of the private identifiers is a distinct globally unique identifier (GUID) (one GUID per set top box). Each private identifier may correspond to a public identifier. For example, the first private identifier 228 may correspond to the first public identifier 230. Elements within the service provider network, such as the server 240, the service configuration system 252, and the diagnostic system 250, may access the first private identifier 228 from the database 218 in response to receiving the public identifier 230 that corresponds to the first private identifier 228. Thus, an IPTV platform within the server 240, the service configuration system 252, and the diagnostic system 250 may retrieve the first private identifier 228 upon receiving a service request from the user 248 where the service request provides the first public identifier 230.

A private identifier, such as the GUID 228 of the first set top box 206, may be used by one or more of the network elements of the service provider network to remotely retrieve problem logs and other information associated with a particular set top box (e.g. the first set top box 206) identified by the first private identifier. For example, the server 240 may retrieve an error log associated with the first set top box 206 upon accessing the first private identifier 228 from the database 218. The server 240 may provide the error log information associated with the first set top box 206 to either the service configuration system 252 or to the diagnostic system 250. The diagnostic system 250 may utilize the error log information in order to perform diagnostic tests on the particular set top box (for example, the first set top box 206) identified by the first private identifier 228. Once the diagnostic system 250 performs the diagnostic tests, the diagnostic system 250 may send an indication to the server 240 to perform a service action. The server 240, based on the first private identifier 228, performs a service action by initiating a command for the first set top box 206. Thus, the server 240 may send a command to the first set top box 206 identified by the first private identifier 228. In this scenario, the other set top boxes 208 and 212 are not affected by the service action or by the commands sent by the server 240. Thus, the server 240 may uniquely identify and perform service actions via the residential gateway 214 with respect to a particular set top box (e.g. set top box 206) without affecting any of the other set top boxes (e.g. set top boxes 208,212) coupled to the residential gateway 214.

During use of a communication service, such as a television service, a signal to a television may be lost. For example, a signal to the television 202 may be lost. The user 248, upon noticing the problem with television 202, checks the television 204 and the television 210 and concludes that both of the televisions 204 and 210 are operating properly. To respond to the problem with the first television 202 coupled to the first set top box 206, the user 248 determines the first public identifier 230 for the first set top box 206. In one embodiment, the first public identifier 230 is displayed on an LED screen of the first set top box 206.

In one embodiment, the user 248 communicates using the telephone 256 to the customer care/repair service system 254 to alert the customer care/repair system 254 that a set top box is not operating properly. For example, the user may use the telephone 256 to communicate to the customer care/repair service system 254 that the first set top box 206 is not operating properly. The customer care/repair service system 254 prompts the user 248 to provide the public identifier of the set top box that is not operating properly. The user may then input the first public identifier 230 of the first set top box 206. The customer care repair service system 254 begins the problem resolution process to determine why the identified set top box is not operating properly. In a particular embodiment, the user 248 informs a technician of the public identifier and the technician performs diagnostic tests to determine why the set top box is not operating properly.

In another particular embodiment, the user 248 communicates with the customer care/repair service system 254 through the interactive voice response system 246 to start the resolution process. For example, when the interactive voice response system 246 prompts the user 248 for the set top box number, the user may use a touch tone keypad on the phone 256 to enter the public identifier 230. The interactive voice response system 246 then sends a message to the customer care/repair service system 254 to begin the resolution process to determine why the identified set top box is not operating properly.

In another particular embodiment, the user 248 uses a computing device, such as a personal computer or a personal digital assistant, to access the self service web portal 244 via the Internet. The self service web portal 244 prompts the user 248 to enter the public identifier of the set top box that is not operating properly. The self service web portal 244 accesses the customer care/repair system 254 to begin the resolution process with respect to the identified set top box.

Once the resolution process begins, the customer care/repair system 254 queries the diagnostic system 250 using the user record 220 and the public identifier provided by the user 248 to retrieve the private identifier corresponding to the public identifier of the set top box. For example, the user 248 may provide the first public identifier 230 and the first public identifier 230 may be used to retrieve the first private identifier 228 for the first set top box 206. The retrieved private identifier is communicated to the diagnostic system 250 to start the diagnostic process. In a particular embodiment, the diagnostic system 250 retrieves a log file associated with the set top box, analyzes the log file, and determines that a reboot of the set top box should be performed. The diagnostic system 250 then sends a reboot recommendation to the customer care/repair system 254 to reboot the first set top box 206. In response to the reboot recommendation, a reboot command is sent to the first set top box 206 via the residential gateway

214. The reboot command triggers a reboot of the first set top box 206 without affecting operation at any of the other STBs 208, 212.

Figure 3:
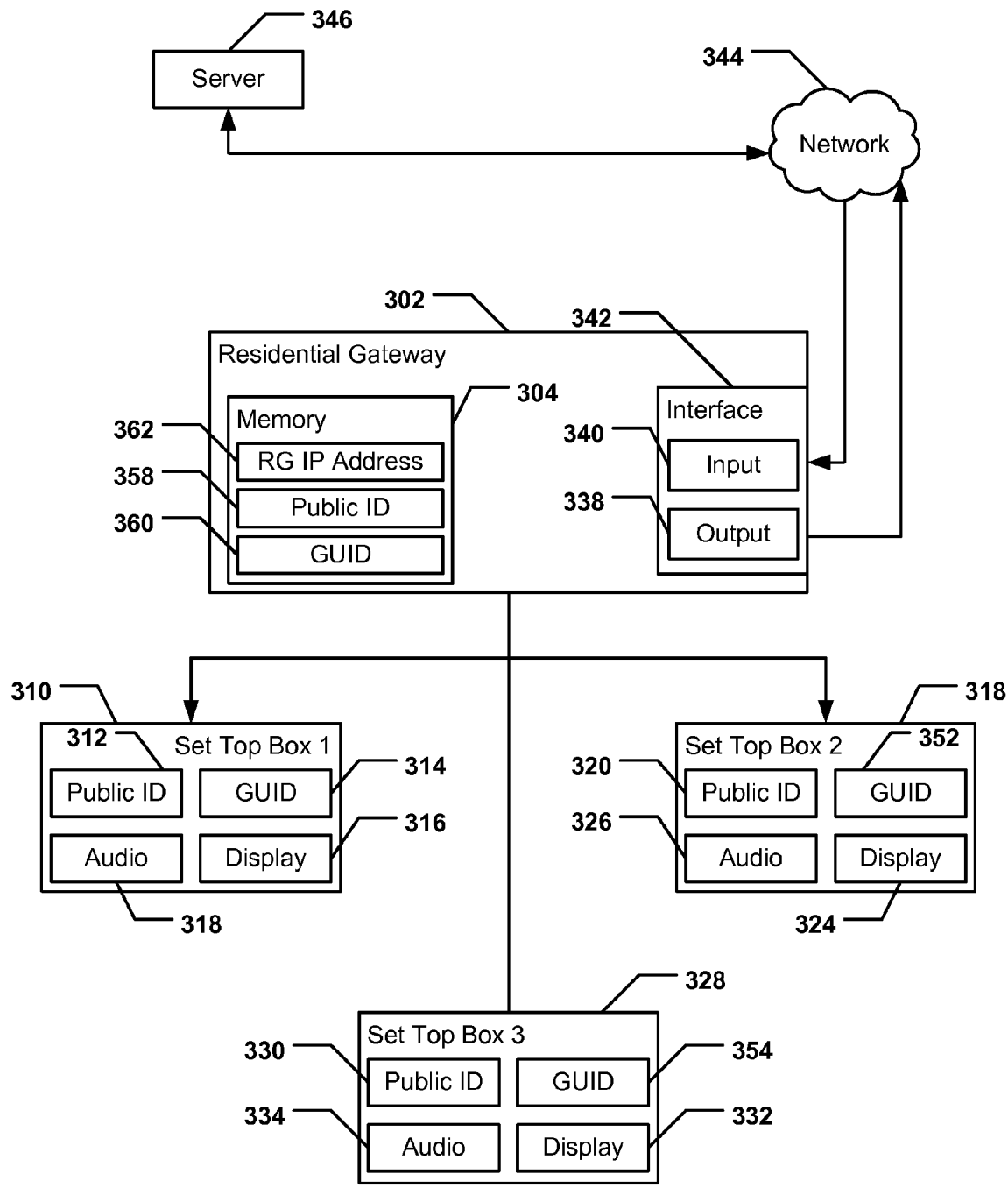
FIG. 3 is a block diagram of a third particular embodiment of a system to support user identification of a set top box.

Referring to FIG. 3, a third particular embodiment of a system to support identification of a set top box is shown. The system includes a residential gateway 302 that is coupled to a plurality of set top boxes. The residential gateway 302 is coupled to a first set top box 310, a second set top box 318, and a third set top box 328. The first set top box 310 includes a first public identifier 312, a first private identifier 314, a display device 316, such as a light emitting diode (LED), and an audio playback component 318. The second set top box 318 includes a second public identifier 320, a second private identifier 352, a second audio component 326, and a second display device 324. The third set top box 328 includes a third public identifier 330, a third private identifier 354, a third audio component 334, and a third display device 332. Each of the plurality of the set top boxes may be coupled to a display device, such as a television (not shown). In a particular embodiment, the residential gateway 302 includes a memory 304 that stores an IP address 362 of the residential gateway 302, one or more public identifiers 358 and one or more private identifiers 360. For example, the memory 304 may store the first public identifier 312, the second public identifier 320, and third public identifier 330 from each of the respective set top box devices 310, 318, 328 in the public identifier region 358.

The residential gateway 302 is coupled via an interface 342 to a network 344. The network 344 may be a distributed data network that is coupled to a remotely located server 346. An example of the server 346 is the server 140 of FIG. 1 or the server 240 of FIG. 2.

The interface 342 of the residential gateway 302 includes an input 340 and an output 338. The input 340 and the output 338 may be implemented as separate components or as a combined I/O component within the residential gateway 302. The components may be software components or hardware components based on a particular implementation. The output 338 is operative to output a service request associated with a particular set top box of the plurality of set top boxes. For example, the output 340 may send a service request that includes the first public identifier 312 to identify the first set top box 310 as a particular set top box needing service attention. The service request may be sent as a message that encodes or embeds the first public identifier 312 associated with the first set top box 310. The first public identifier 312 of the first set top box 310 is usable by a service provider network, such as a network coupled the server 346, to determine the first private identifier 350 corresponding to the first public identifier 312. The server 346 identifies the first private identifier 314 uniquely associated with the first set top box 310. The first private identifier 314 may be used by the server 346 to perform a service action that is exclusively performed on the first set top box 310, without impacting service of any of the other set top boxes 318 and 328. In a particular embodiment, the first private identifier is a globally unique identifier (GUID).

The input 340 is operative to receive a command from the server 346, where the command is associated with a service action to be performed with respect to a particular set top box. For example, the server 346 may send a command associated with a service action to be performed by the first set top box 310. In this example, the service command is communicated from the server 346 that has access to the first private identifier 314 associated with the first set top box 310. For example, the first public identifier 312 may have a corresponding first private identifier 314 stored or accessible within the server 346, where the first private identifier 314 uniquely identifies the first set top box 310. The server 346 sends the command associated with the service action to be performed at the first set top box 310 via the data network 344, and the command is received by the input 340.

In a particular embodiment, each of the set top boxes 310, 318, 328 includes an audio component as shown. For example, the first set top box 310 includes the first audio component 318. The first audio component 318 is operative to send a signal to a playback device such as a television with a speaker to audibly announce the first public identifier 312. Alternatively, the first set top box 310 may display the first public identifier 312 via the display device 316 or via a television. Thus, the first set top box 310 may display the first public identifier 312 or may audibly announce the first public identifier 312 via the audio playback component 318. By use of the audio playback component 318, a user that is visually impaired may be able to hear the first public identifier 312 and may use the first public identifier 312 to make a service request that identifies the first set top box 310.

The system of FIG. 3 may thus enable a user to uniquely identify any of a plurality of STBs (e.g., the STBs 310, 318, 328) and request service actions for a particular malfunctioning STB without affecting other STBs. The system of FIG. 3 may also provide user convenience by enabling a visual/audio/audiovisual display of STB public identifiers, instead of requiring a user to find a serial number on the STB or in a system menu of the STB. The system of FIG. 3 may also enable users and service providers to decrease a number of on-site service calls, because malfunctioning STBs may be fixed remotely.

Figure 4:
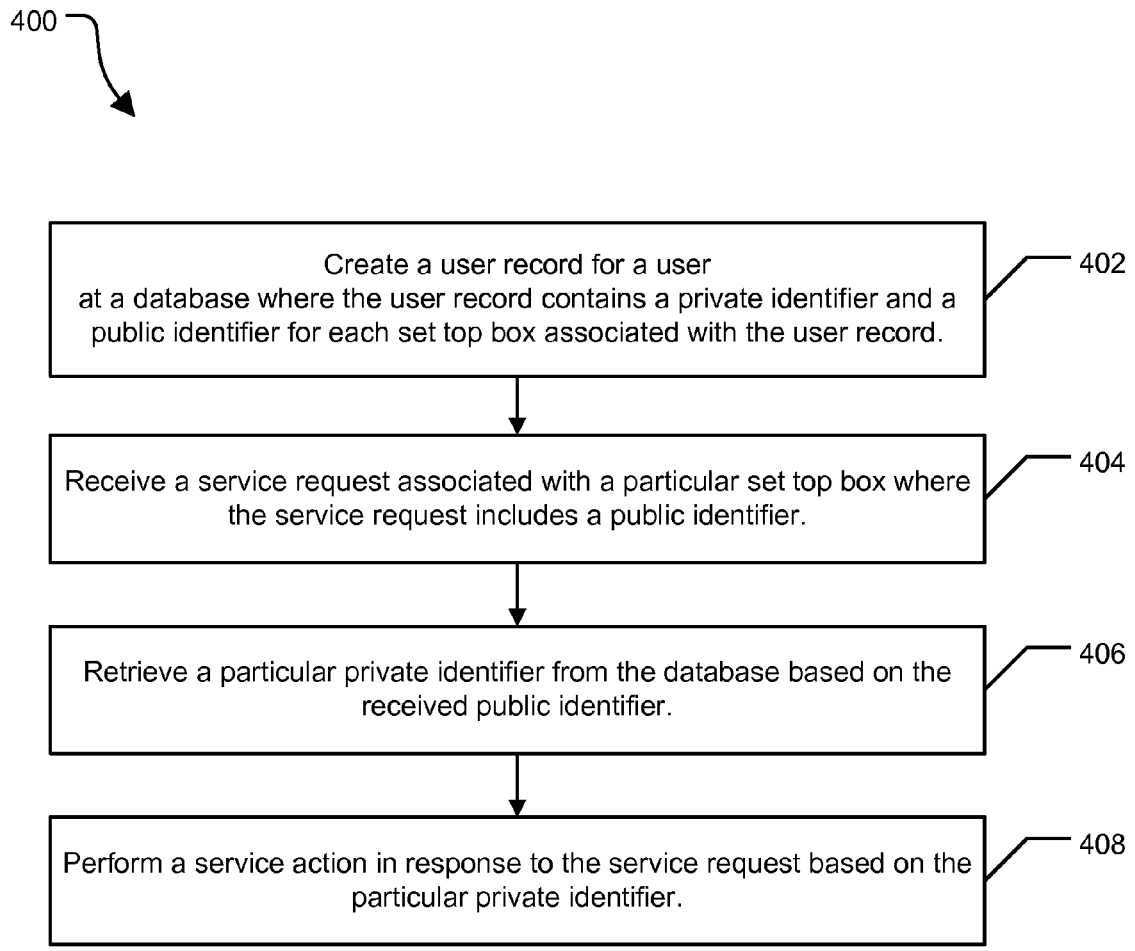
FIG. 4 is a flow diagram of a particular embodiment of a method to support user identification of a set top box.

Referring to FIG. 4, a particular embodiment of a method of processing user records and service requests associated with a particular set top box is shown. The method includes creating a user record for a user where the user record contains a private identifier and a public identifier for each set top box associated with the user, at 402. The user record may be created at a database of a service provider. The method further includes receiving a service request associated with a particular set top box where the service request includes a public identifier, at 404. The service request includes a particular public identifier that identifies the particular set top box. For example, the first public identifier 130 of the first set top box 106 may be received by the server 140 to identify the particular set top box as the first set top box 106.

The method further includes retrieving a particular user record of the plurality of user records from the database based on the particular public identifier associated with the particular set top box, at 406. For example, the first user record 120 may be retrieved by the server 140 based on receipt of the first public identifier 130 from the residential gateway 114 coupled to the first set top box 106. The method further includes retrieving a particular private identifier from a database based on the received public identifier, at 408. For example, the server 140 may retrieve the first private identifier 128 corresponding to the first public identifier 130 by accessing the first user record 120 in the database 118. The method further includes performing a service action in response to the service request based on the particular private identifier associated with the particular set top box, at 410. For example, the server 140 may perform a service action based on the first private identifier 128 that is associated with the first set top box 106. In a particular embodiment, the first private identifier 128 is a globally unique identifier (GUID).

In a particular embodiment, the service request is received via an interactive voice response (IVR) device. Alternatively, the service request may be received over a data network. In a particular embodiment, the server is a server of an internet protocol television (IPTV) platform, and the server of the IPTV platform may receive a service request via a distributed IPTV data network.

In a particular embodiment, the plurality of user records may be dynamically created or deleted on behalf of a user. For example, each of the plurality of user records 120, 122, 124 may be created within the database 118 in response to input from the user 148. Thus, as set top box devices are added or removed, the user records within the database 118 may be modified. For example, when a particular public identifier is deleted by a user, the particular private identifier corresponding to the particular public identifier may also be removed from the database 118. As another example, when a private identifier is deleted by a service provider, the corresponding public identifier may also be removed from the database 118.

In a particular embodiment, a service action initiated by the server 140 in response to a user request that identifies a particular public identifier of a particular set top box may include a command to perform the service action. For example, the types of user actions/service actions that may be performed include retrieving problem logs for a particular set top box, performing general diagnostics on the particular set top box, checking the speed or bandwidth available to the particular set top box, or performing targeted diagnostics testing on the hardware or software of the particular set top box.

In a particular embodiment, the command may initiate a reboot of the particular identified set top box. For example, the server 140 may initiate a reboot command that is received at the first set top box 106 and the first set top box 106 may be rebooted upon receiving the reboot command. In this scenario, the other set top boxes, such as the set top boxes 108, 112, may not be rebooted and are not affected by the service command. A service command may be initiated by a service provider to a particularly identified set top box for a user that has multiple set top box devices (e.g. a user with a local network or a residential gateway coupled to multiple set top box devices). In addition, the user may identify the particular set top box to receive service by use of a public identifier that is accessible by the user. The public identifier may be displayable at or near (e.g. at a television) the particular set top box. The public identifier for each set top box may be user defined for convenience of the user. In addition, the service provider may use a private identifier that corresponds to the public identifier to uniquely identify the particular set top box. Further, a user may be able to readily identify a troubled set top box when using a self service channel (e.g., an Internet-accessible self service web portal) to resolve a problem with the set top box. Because a troubled set top box can be identified by a public identifier that the user can access, the user may not need to reboot all the set top boxes or perform intrusive testing to non-troubled set top boxes because the particular troubled set top box can be identified by the user.

Figure 5:
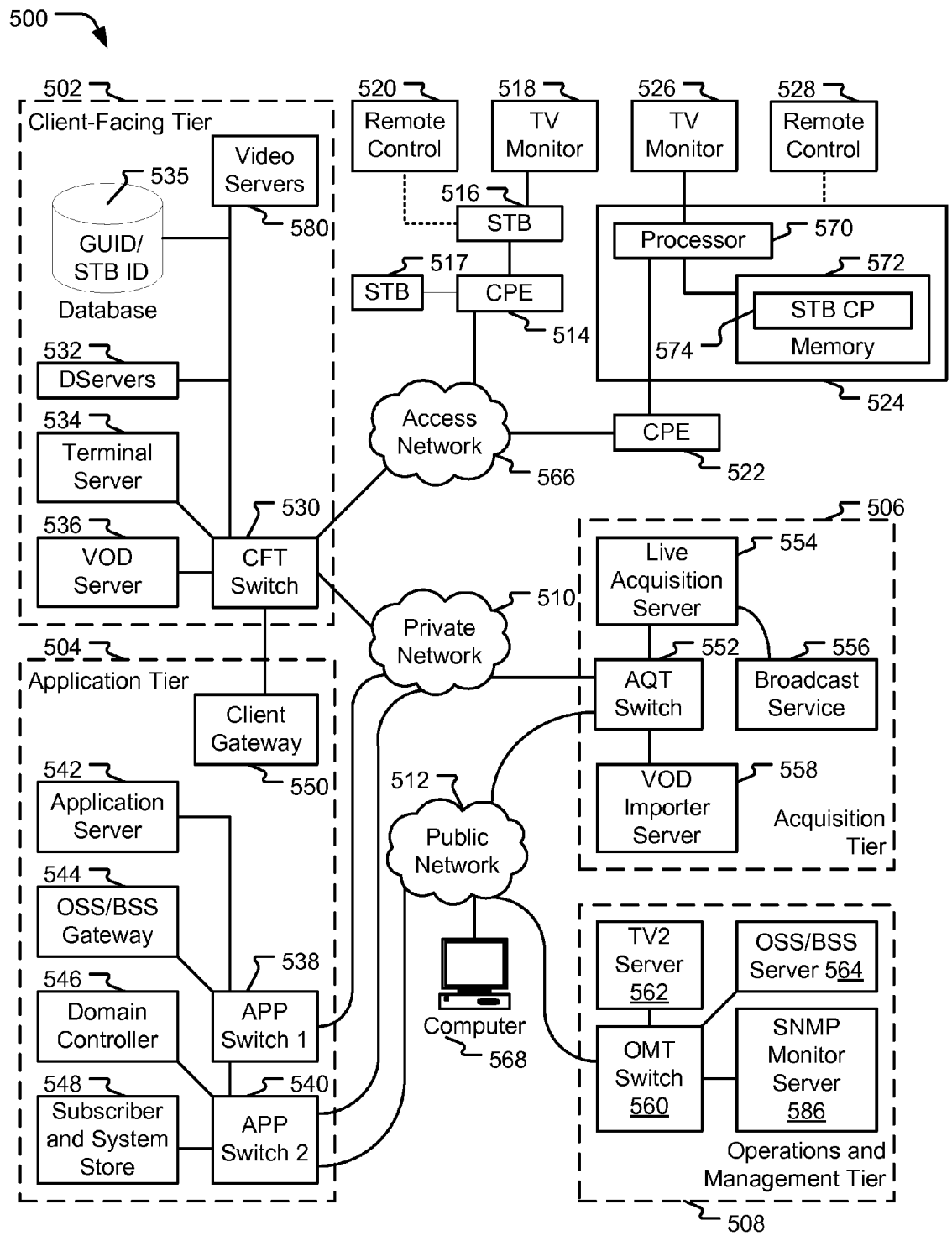
FIG. 5 is a block diagram of an illustrative embodiment of a general internet protocol television (IPTV) system.

Referring to FIG. 5, an illustrative embodiment of an Internet Protocol Television (IPTV) system that may be used to support user identification of a set top box is illustrated and is generally designated 500. As shown, the system 500 can include a client-facing tier 502, an application tier 504, an acquisition tier 506, and an operations and management tier 508. Each tier 502, 504, 506, 508 is coupled to a private network 510; to a public network 512, such as the Internet; or to both the private network 510 and the public network 512. For example, the client-facing tier 502 can be coupled to the private network 510. Further, the application tier 504 can be coupled to the private network 510 and to the public network 512. The acquisition tier 506 can also be coupled to the private network 510 and to the public network 512. Additionally, the operations and management tier 508 can be coupled to the public network 512.

As illustrated in FIG. 5, the various tiers 502, 504, 506, 508 communicate with each other via the private network 510 and the public network 512. For instance, the client-facing tier 502 can communicate with the application tier 504 and the acquisition tier 506 via the private network 510. The application tier 504 can communicate with the acquisition tier 506 via the private network 510. Further, the application tier 504 can communicate with the acquisition tier 506 and the operations and management tier 508 via the public network 512. Moreover, the acquisition tier 506 can communicate with the operations and management tier 508 via the public network 512. In a particular embodiment, elements of the application tier 504, including, but not limited to, a client gateway 550, can communicate directly with the client-facing tier 502.

The client-facing tier 502 can communicate with user equipment via an access network 566, such as an Internet Protocol Television (IPTV) access network. In an illustrative embodiment, customer premises equipment (CPE) 514, 522 can be coupled to a local switch, router, or other device of the access network 566. The client-facing tier 502 can communicate with a first representative set top box device 516 at a first customer premise via the first CPE 514 and with a second representative set top box device 524 at a second customer premise via the second CPE 522. The client facing-tier 502 can also communicate with a third representative set top box device 517 at the first customer premise via the first CPE 514. The CPE 514, 522 can include routers, local area network devices, modems, such as digital subscriber line (DSL) modems, residential gateways, any other suitable devices for facilitating communication between a set top box device and the access network 566, or any combination thereof.

In a particular embodiment, the client-facing tier 502 can be coupled to the CPE 514, 522 via fiber optic cables. Alternatively, the CPE 514, 522 can be digital subscriber line (DSL) modems that are coupled to one or more network nodes via twisted pairs, and the client-facing tier 502 can be coupled to the network nodes via fiber-optic cables. Each set top box device 516, 524 can process data received via the access network 566, via an IPTV software platform.

The first set top box device 516 can be coupled to a first external display device, such as a first television monitor 518, and the second set top box device 524 can be coupled to a second external display device, such as a second television monitor 526. Moreover, the first set top box device 516 can communicate with a first remote control 520, and the second set top box device 524 can communicate with a second remote control 528. The third set top box device 517 may similarly be coupled to an external display device. The set top box devices 516, 517, 524 can include IPTV set top box devices; video gaming devices or consoles that are adapted to receive IPTV content; personal computers or other computing devices that are adapted to emulate set top box device functionalities; any other device adapted to receive IPTV content and transmit data to an IPTV system via an access network; or any combination thereof.

In an exemplary, non-limiting embodiment, each set top box device 516, 517, 524 can receive data, video, or any combination thereof, from the client-facing tier 502 via the access network 566 and render or display the data, video, or any combination thereof, at the display device 518, 526 to which it is coupled. In an illustrative embodiment, the set top box devices 516, 524 can include tuners that receive and decode television programming signals or packet streams for transmission to the display devices 518, 526. Further, the set top box devices 516, 517, 524 can include a STB processor 570 and a STB memory device 572 that is accessible to the STB processor 570. In one embodiment, a computer program, such as the STB computer program 574, can be embedded within the STB memory device 572. In another illustrative embodiment, a user computing device 584, such as a personal computer, laptop or local server, can be coupled to a set top box device, such as the second representative set top box device 524, for example, via a universal serial bus (USB) connection or other connection. The set top box devices 516, 517, 524 may also include an onboard display (e.g., LED display) for visual output of a public identifier and a speaker for audio output of the public identifier.

In an illustrative embodiment, the client-facing tier 502 can include a client-facing tier (CFT) switch 530 that manages communication between the client-facing tier 502 and the access network 566 and between the client-facing tier 502 and the private network 510. As illustrated, the CFT switch 530 is coupled to one or more data servers, such as D-servers 532, that store, format, encode, replicate, or otherwise manipulate or prepare video content for communication from the client-facing tier 502 to the set top box devices 516, 517, 524. The CFT switch 530 can also be coupled to a terminal server 534 that provides terminal devices with a connection point to the private network 510. In a particular embodiment, the CFT switch 530 can be coupled to a video-on-demand (VOD) server 536 that stores or provides VOD content imported by the IPTV system 500.

Further, the CFT switch 530 is coupled to one or more video servers 580 that receive video content and transmit the content to the set top boxes 516, 517, 524 via the access network 566.

In an illustrative embodiment, the client-facing tier 502 can communicate with a large number of set top boxes, such as the representative set top boxes 516, 517, 524 over a wide geographic area, such as a regional area, a metropolitan area, a viewing area, a designated market area or any other suitable geographic area, market area, or subscriber or customer group that can be supported by networking the client-facing tier 502 to numerous set top box devices. In a particular embodiment, the CFT switch 530, or any portion thereof, can include a multicast router or switch that feeds one or more video streams from a video server to multiple set top box devices.

As illustrated in FIG. 5, the application tier 504 can communicate with both the private network 510 and the public network 512. The application tier 504 can include a first application tier (APP) switch 538 and a second APP switch 540. In a particular embodiment, the first APP switch 538 can be coupled to the second APP switch 540. The first APP switch 538 can be coupled to an application server 542 and to an OSS/BSS gateway 544. In a particular embodiment, the application server 542 can provide applications to the set top box devices 516, 517, 524 via the access network 566, which enable the set top box devices 516, 517, 524 to provide functions, such as display, messaging, processing of IPTV data and VOD material, etc. In a particular embodiment, the OSS/BSS gateway 544 includes operation systems and support (OSS) data, as well as billing systems and support (BSS) data. In one embodiment, the OSS/BSS gateway 544 can provide or restrict access to an OSS/BSS server 564 that stores operations and billing systems data.

The second APP switch 540 can be coupled to a domain controller 546 that provides Internet access, for example, to users at their computers 568 via the public network 512. For example, the domain controller 546 can provide remote Internet access to IPTV account information, e-mail, personalized Internet services, or other online services via the public network 512. In addition, the second APP switch 540 can be coupled to a subscriber and system store 548 that includes account information, such as account information that is associated with users who access the IPTV system 500 via the private network 510 or the public network 512. In an illustrative embodiment, the subscriber and system store 548 can store subscriber or customer data and create subscriber or customer profiles that are associated with IP addresses of corresponding set top box devices 516, 517, 524.

In a particular embodiment, the application tier 504 can include a client gateway 550 that communicates data directly to the client-facing tier 502. In this embodiment, the client gateway 550 can be coupled directly to the CFT switch 530. The client gateway 550 can provide user access to the private network 510 and the tiers coupled thereto. In an illustrative embodiment, the set top box devices 516, 517, 524 can access the IPTV system 500 via the access network 566, using information received from the client gateway 550. User devices can access the client gateway 550 via the access network 566, and the client gateway 550 can allow such devices to access the private network 510 once the devices are authenticated or verified. Similarly, the client gateway 550 can prevent unauthorized devices, such as hacker computers or stolen set top box devices from accessing the private network 510, by denying access to these devices beyond the access network 566. The client-facing tier 502 may also include a database 530 to store associations of private STB GUIDs and public STB IDs. For example, the database 530 may include a first GUID and a first STB ID for the first STB 514, a second GUID and a second STB ID for the second STB 524, and a third GUID and a third STB ID for the third STB 517.

For example, when the first representative set top box device 516 accesses the client-facing tier 502 via the access network 566, the client gateway 550 can verify subscriber information by communicating with the subscriber and system store 548 via the private network 510. Further, the client gateway 550 can verify billing information and status by communicating with the OSS/BSS gateway 544 via the private network 510. In one embodiment, the OSS/BSS gateway 544 can transmit a query via the public network 512 to the OSS/BSS server 564. After the client gateway 550 confirms subscriber and/or billing information, the client gateway 550 can allow the set top box device 516 to access IPTV content and VOD content at the client-facing tier 502. If the client gateway 550 cannot verify subscriber information for the set top box device 516, e.g., because it is connected to an unauthorized twisted pair, the client gateway 550 can block transmissions to and from the set top box device 516 beyond the access network 566.

As indicated in FIG. 5, the acquisition tier 506 includes an acquisition tier (AQT) switch 552 that communicates with the private network 510. The AQT switch 552 can also communicate with the operations and management tier 508 via the public network 512. In a particular embodiment, the AQT switch 552 can be coupled to a live acquisition server 554 that receives or acquires television content, movie content, advertisement content, other video content, or any combination thereof, from a broadcast service 556, such as a satellite acquisition system or satellite head-end office. In a particular embodiment, the live acquisition server 554 can transmit content to the AQT switch 552, and the AQT switch 552 can transmit the content to the CFT switch 530 via the private network 510.

In an illustrative embodiment, content can be transmitted to the D-servers 532, where it can be encoded, formatted, stored, replicated, or otherwise manipulated and prepared for communication from the video server(s) 580 to the set top box devices 516, 517, 524. The CFT switch 530 can receive content from the video server(s) 580 and communicate the content to the CPE 514, 522 via the access network 566. The set top box devices 516, 524 can receive the content via the CPE 514, 522, and can transmit the content to the television monitors 518, 526. In an illustrative embodiment, video or audio portions of the content can be streamed to the set top box devices 516, 517, 524.

Further, the AQT switch 552 can be coupled to a video-on-demand importer server 558 that receives and stores television or movie content received at the acquisition tier 506 and communicates the stored content to the VOD server 536 at the client-facing tier 502 via the private network 510. Additionally, at the acquisition tier 506, the video-on-demand (VOD) importer server 558 can receive content from one or more VOD sources outside the IPTV system 500, such as movie studios and programmers of non-live content. The VOD importer server 558 can transmit the VOD content to the AQT switch 552, and the AQT switch 552, in turn, can communicate the material to the CFT switch 530 via the private network 510. The VOD content can be stored at one or more servers, such as the VOD server 536.

When users issue requests for VOD content via the set top box devices 516, 517, 524, the requests can be transmitted over the access network 566 to the VOD server 536, via the CFT switch 530. Upon receiving such requests, the VOD server 536 can retrieve the requested VOD content and transmit the content to the set top box devices 516, 517, 524 across the access network 566, via the CFT switch 530. The set top box devices 516, 517, 524 can transmit the VOD content to the television monitors 518, 526. In an illustrative embodiment, video or audio portions of VOD content can be streamed to the set top box devices 516, 517, 524.

FIG. 5 further illustrates that the operations and management tier 508 can include an operations and management tier (OMT) switch 560 that conducts communication between the operations and management tier 508 and the public network 512. In the embodiment illustrated by FIG. 5, the OMT switch 560 is coupled to a TV2 server 562. Additionally, the OMT switch 560 can be coupled to an OSS/BSS server 564 and to a simple network management protocol (SNMP) monitor 586 that monitors network devices within or coupled to the IPTV system 500. In a particular embodiment, the OMT switch 560 can communicate with the AQT switch 552 via the public network 512.

In an illustrative embodiment, the live acquisition server 554 can transmit content to the AQT switch 552, and the AQT switch 552, in turn, can transmit the content to the OMT switch 560 via the public network 512. In this embodiment, the OMT switch 560 can transmit the content to the TV2 server 562 for display to users accessing the user interface at the TV2 server 562. For example, a user can access the TV2 server 562 using a personal computer (PC) 568 coupled to the public network 512.

Figure 6:
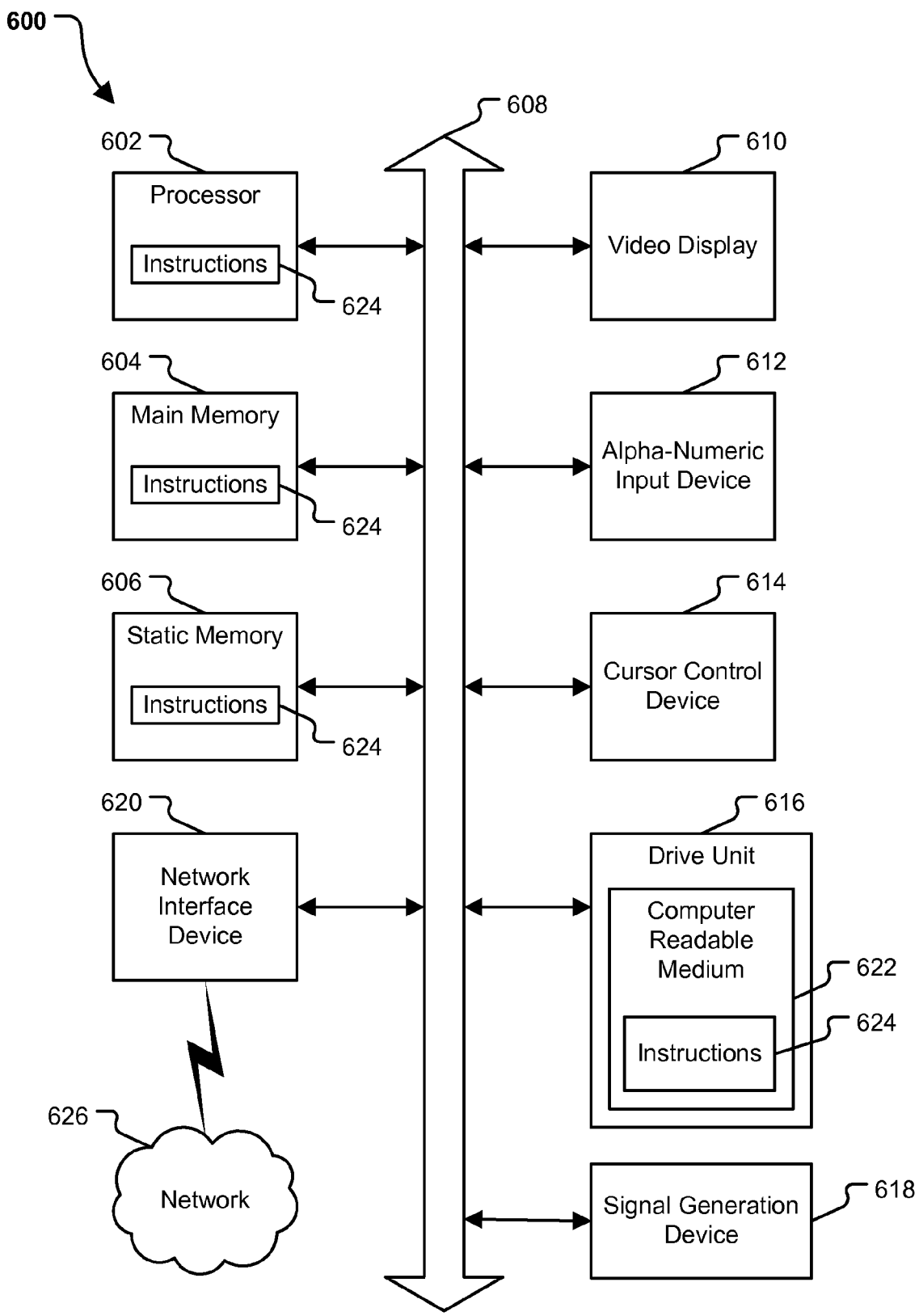
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods, algorithms, or computer based functions disclosed herein, such as the method of FIG. 4. The computer system 600, or any portion thereof, may operate as a standalone device or may be connected, e.g., using a network, to other computer systems or peripheral devices. In an illustrative embodiment, the computer system 600 may include one or more of the set top boxes 106, 108, 112 of FIG. 1, the residential gateway 147 of FIG. 1, the server 140 of FIG. 1, the systems 142, 144 of FIG. 1, the database 118 of FIG. 1, the set top boxes 206, 208, 212 of FIG. 2, the residential gateway 214 of FIG. 2, the server 240 of FIG. 2, the systems 250, 252, 254 of FIG. 2, the database 218 of FIG. 2, the set top boxes 310, 318, 328 of FIG. 3, the residential gateway 302 of FIG. 3, and the server 346 of FIG. 3. Each of the set top boxes 106, 108, 112 of FIG. 1, the residential gateway 147 of FIG. 1, the server 140 of FIG. 1, the systems 142, 144 of FIG. 1, the database 118 of FIG. 1, the set top boxes 206, 208, 212 of FIG. 2, the residential gateway 214 of FIG. 2, the server 240 of FIG. 2, the systems 250, 252, 254 of FIG. 2, the database 218 of FIG. 2, the set top boxes 310, 318, 328 of FIG. 3, the residential gateway 302 of FIG. 3, and the server 346 of FIG. 3 may include or be implemented using the computer system 600 or a portion thereof.

In a networked deployment, the computer system 600 may operate in the capacity of a server. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, or a solid-state display. Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data commands that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible storage medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
receiving a request related to a media device, the request including a public identifier of the media device and a user account identifier, wherein the public identifier is accessible by a user associated with the media device;
accessing, based on the user account identifier, a user record from a database of user records, wherein the user record is associated with a user account corresponding to a location;
determining, from the user record, a private identifier of the media device corresponding to the public identifier of the media device, wherein the private identifier is unique to the media device among a set of media devices associated with the user record and the private identifier is inaccessible by the user;

using the private identifier to perform an action related to the media device in response to the request;

receiving a user request to delete the public identifier from the database;

removing the private identifier from the database; and in response to removing the private identifier from the database, deleting the public identifier from the database.

2. The method of claim 1, wherein the public identifier is user defined.

3. The method of claim 1, wherein the private identifier is a globally unique identifier.

4. The method of claim 3, wherein the globally unique identifier and the public identifier are accessible by a service configuration system and a policy management system.

5. The method of claim 1, further comprising, after determining the private identifier, remotely retrieving a data log from the media device.

6. The method of claim 1, wherein the request is received via an interactive voice response device.

7. The method of claim 1, wherein the request is received at a server of an Internet protocol television system.

8. The method of claim 1, wherein the media device is rebooted in response to performing the action.

9. A device comprising:
a processor; and
a memory accessible to the processor, the memory storing a database associated with a service provider, wherein the database includes a plurality of user records, and wherein a particular user record comprises:
an account identifier associated with the particular user record;
a public identifier of a media device that is associated with the particular user record, wherein public identifier is accessible by a user of the media device; and
a private identifier of the media device, wherein the private identifier is unique to the media device among a set of media device, wherein the private identifier is inaccessible by the user, wherein the processor is configured to cause an action related to the media device to be performed using the private identifier, wherein the public identifier is deleted from the particular user record in response to removal of the private identifier from the database, and wherein the private identifier is removed from the database in response to a user request to delete the public identifier from the database.

10. The device of claim 9, wherein the processor is configured to receive, via a service interface, a request that includes the account identifier and the public identifier of the media device, and to retrieve the private identifier based on the account identifier and the public identifier by accessing the database.

11. The device of claim 9, wherein the action related to the media device includes sending a command to reboot the media device, wherein the command is addressed using the private identifier.

12. The device of claim 9, wherein the public identifier is user defined.

13. The device of claim 9, wherein the private identifier is a globally unique identifier.

14. The device of claim 9, wherein the particular user record includes information identifying a plurality of media devices associated with a single user location, wherein each of the plurality of media devices is associated with a different public identifier.

15. A system comprising:
a processor; and
a memory accessible to the processor, wherein the memory includes instructions executable by the processor, to cause the processor to perform operations comprising:
receiving a request related to a media device, the request including a public identifier of the media device and a user account identifier, wherein the public identifier is accessible by a user associated with the media device;
accessing, based on the user account identifier, a user record from a database of user records, wherein the user record is associated with a user account corresponding to a location;
determining, from the user record, a private identifier of the media device corresponding to the public identifier of the media device, wherein the private identifier is unique to the media device among a set of media devices associated with the user record and the private identifier is inaccessible by the user;
using the private identifier to perform an action related to the media device in response to the request;
receiving a user request to delete the public identifier from the database;
removing the private identifier from the database; and
in response to removing the private identifier from the database, deleting the public identifier from the database.

16. The system of claim 15, wherein the private identifier is a globally unique identifier.

17. The system of claim 15, wherein the user record includes information identifying a plurality of media devices associated with the location, wherein each of the plurality of media devices is associated with a different public identifier.

18. The system of claim 15, wherein the action includes rebooting the media device.

19. The system of claim 15, wherein the media device is configured to cause the public identifier to be audibly output.

* * * * *